US00RE49143E

(19) United States
(12) Reissued Patent
Ishikawa et al.

(10) Patent Number: US RE49,143 E
(45) Date of Reissued Patent: Jul. 19, 2022

(54) IMAGE FORMING APPARATUS

(71) Applicant: CANON KABUSHIKI KAISHA, Tokyo (JP)

(72) Inventors: Rin Ishikawa, Ushiku (JP); Kiyoshi Oyama, Tokyo (JP)

(73) Assignee: Canon Kabushiki Kaisha, Tokyo (JP)

(21) Appl. No.: 16/233,720

(22) Filed: Dec. 27, 2018

Related U.S. Patent Documents

Reissue of:

(64) Patent No.: 9,535,365
Issued: Jan. 3, 2017
Appl. No.: 14/922,336
Filed: Oct. 26, 2015

(30) Foreign Application Priority Data

Oct. 30, 2014 (JP) ..... 2014-221347

(51) Int. Cl.
*G03G 15/08* (2006.01)
*G03G 21/16* (2006.01)
(Continued)

(52) U.S. Cl.
CPC ..... *G03G 15/0865* (2013.01); *F16H 1/08* (2013.01); *F16H 55/17* (2013.01);
(Continued)

(58) Field of Classification Search
CPC ..... G03G 15/0865; G03G 15/757; G03G 21/1647; G03G 21/1676;
(Continued)

(56) References Cited

U.S. PATENT DOCUMENTS 6,708,013 B2 * 3/2004 Nomura ..... G03G 15/0194 399/167
2002/0029648 A1 * 3/2002 Noguchi et al. ..... F16H 55/17 74/461
(Continued)

FOREIGN PATENT DOCUMENTS

CN 103807360 A 5/2014
GB 2 397 136 A 7/2004
(Continued)

OTHER PUBLICATIONS

English translation of JP-04351365-A retrieved from Japan Platform for Patent Information (J-PlatPat) at https://www.j-platpat.inpit.go.jp.*
(Continued)

*Primary Examiner* — Peter C English
(74) *Attorney, Agent, or Firm* — Venable LLP

(57) ABSTRACT

Provided is an image forming apparatus that forms an image on a recording material, the apparatus including: a first helical gear and a second helical gear that are engaged with each other; and a driving portion that applies a driving force to the first helical gear, wherein at least one of the first helical gear and the second helical gear is a helical gear in which torsional rigidity in a tooth width direction of one side end in a width direction of the gear is larger than torsional rigidity in a tooth width direction of the other side end, and wherein a twist direction of helical teeth and a rotational direction of the first helical gear due to the driving portion are set such that the other side end is engaged earlier than the one side end.

17 Claims, 10 Drawing Sheets

Amended

(51) Int. Cl.

| | |
|---|---|
| ***F16H 1/08*** | (2006.01) |
| ***F16H 55/17*** | (2006.01) |
| *F16H 55/06* | (2006.01) |
| *F16H 55/08* | (2006.01) |

(52) U.S. Cl.
CPC ... *G03G 21/1647* (2013.01); *F16H 2055/065* (2013.01); *F16H 2055/0866* (2013.01); *G03G 15/0872* (2013.01); *G03G 2221/1657* (2013.01)

(58) Field of Classification Search
CPC ..... G03G 2221/1657; F16H 1/08; F16H 2055/065; F16H 2055/0866; F16H 55/14; F16H 55/17
See application file for complete search history.

(56) References Cited

U.S. PATENT DOCUMENTS

| | | | | |
|---|---|---|---|---|
| 2003/0131678 | A1 | 7/2003 | Noguchi et al. | |
| 2004/0190937 | A1 | 9/2004 | Mercer et al. | |
| 2005/0238388 | A1* | 10/2005 | Tanaka | G03G 15/50 399/167 |
| 2007/0053719 | A1* | 3/2007 | Kamimura et al. | G03G 15/757 399/167 |
| 2007/0122164 | A1* | 5/2007 | Shiori et al. | G03G 21/1875 399/8 |
| 2007/0283777 | A1* | 12/2007 | Suzuki et al. | B29C 45/0046 74/434 |
| 2008/0066570 | A1* | 3/2008 | Kashimura | B29C 33/005 74/439 |
| 2011/0091237 | A1* | 4/2011 | Suzuki | G03G 15/161 399/101 |
| 2012/0014717 | A1* | 1/2012 | Sugiyama | G03G 15/0121 399/228 |
| 2012/0251177 | A1* | 10/2012 | Tomatsu | G03G 21/1647 399/167 |
| 2014/0123796 | A1 | 5/2014 | Ishida et al. | |
| 2014/0373657 | A1* | 12/2014 | Tamura et al. | F16H 1/08 74/421 A |

FOREIGN PATENT DOCUMENTS

| | | | | |
|---|---|---|---|---|
| JP | 3-28565 | A | | 2/1991 |
| JP | H03-99264 | U | | 10/1991 |
| JP | 4-351365 | A | | 12/1992 |
| JP | 8-6437 | A | | 1/1996 |
| JP | H08-069239 | A | | 3/1996 |
| JP | 9-230657 | A | | 9/1997 |
| JP | 3666978 | B2 | | 6/2005 |
| JP | 2006-242325 | A | | 9/2006 |
| JP | 2006301389 | A | | 11/2006 |
| JP | 2006329243 | A | * | 12/2006 |
| JP | 2014169723 | A | | 9/2014 |

OTHER PUBLICATIONS

English translation of JP-08006437-A retrieved from Japan Platform for Patent Information (J-PlatPat) at https://www.j-platpat.inpit.go.jp.*
English translation of JP-09230657-A retrieved from Japan Platform for Patent Information (J-PlatPat) at https://www.j-platpat.inpit.go.jp.*
English translation of JP-2006301389-A retrieved from Japan Platform for Patent Information (J-PlatPat) at https://www.j-platpat.inpit.go.jp.*
English translation of JP-2006329243-A retrieved from Japan Platform for Patent Information (J-PlatPat) at https://www.j-platpat.inpit.go.jp.*
English translation of JP-2014169723-A retrieved from Japan Platform for Patent Information (J-PlatPat) at https://www.j-platpat.inpit.go.jp.*
Wikipedia article entitled "Gear" retrieved at https://en.wikipedia.org/wiki/Gear.*
Chinese Office Action issued in corresponding Chinese Application No. 201510737257.X dated Mar. 28, 2019.
European Communication Pursuant to Article 94(3) issued in corresponding European Application No. 15192111.1-1022 dated Jul. 22, 2019.
European Office Action dated Jan. 30, 2020, in corresponding European Application No. 15192111.1.
Search Report issued in European Patent Application No. 15192111.1, dated Mar. 30, 2016.

* cited by examiner

Amended

IMAGE FORMING APPARATUS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND OF THE INVENTION

Field of the Invention

The present invention relates to an image forming apparatus such as a copying machine or a printer equipped with a function of forming an image on a recording material such as a sheet.

Description of the Related Art

Japanese Patent Laid-Open No. 9-230657 discloses a configuration in which an annular rib is disposed between a central portion and a tooth surface of a gear and the tooth surface and the annular rib are disposed at an interval so as not to come in contact with each other. According to such a configuration, since the tooth surface and the annular rib do not contact with each other, phenomena are suppressed in which a portion of the tooth surface coming in contact with the annular rib is deformed by shrinkage during molding and thus accuracy of the tooth surface deteriorates.

By this configuration, it is considered that variation in a position occurs due to a rotation fluctuation or vibration of an image preparing portion caused by a rotation fluctuation or vibration occurring at a gear engagement cycle and thus a periodic band-like uneven density called a banding image is prevented.

However, the invention disclosed in Japanese Patent Laid-Open No. 9-230657 does not cope with reduction in size of a gear and modules for the purpose of miniaturization of an apparatus body in recent years. It is difficult to make the modules smaller in the case of reducing the size of the gear. This reason is that stress applied to a tooth root of the gear rises when the size of the module becomes smaller.

Under these circumstance, the inventors paid attention to the fact that a portion of an arm formed between the tooth surface and a rotation support portion is disposed at the center of a tooth width direction in the configuration illustrated in FIG. 3 of Japanese Patent Laid-Open No. 9-230657. The inventors found that it is possible to reduce the size of the module and to lower the stress applied to the tooth root of the gear by changing the arrangement of the arm.

SUMMARY OF THE INVENTION

The invention is to provide an image forming apparatus capable of suppressing stress concentration on a tooth root of a gear.

An image forming apparatus that forms an image on a recording material includes: a first helical gear and a second helical gear that are engaged with each other; and a driving portion that applies a driving force to the first helical gear, wherein at least one of the first helical gear and the second helical gear is a helical gear in which torsional rigidity in a tooth width direction of one side end in a width direction of the gear is larger than torsional rigidity in a tooth width direction of the other side end, and wherein a twist direction of helical teeth and a rotational direction of the first helical gear due to the driving portion are set such that the other side end is engaged earlier than the one side end.

Further features of the present invention will become apparent from the following description of exemplary embodiments with reference to the attached drawings.

DESCRIPTION OF THE EMBODIMENTS

Figure 1:
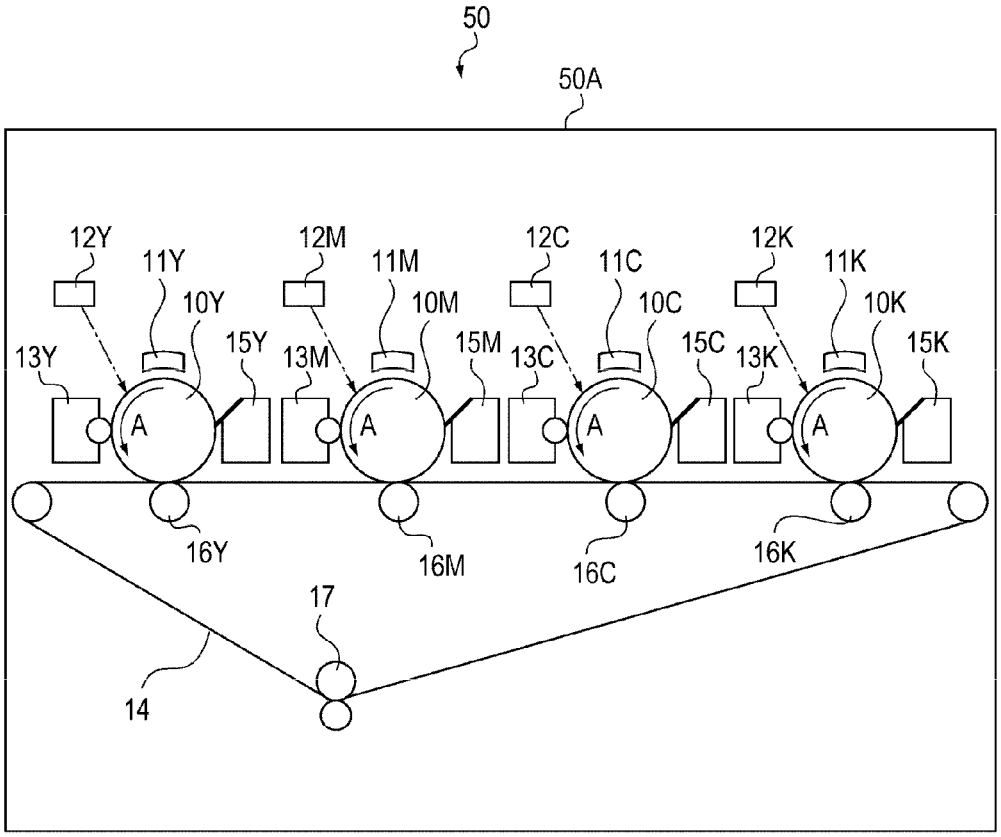
FIG. 1 is a schematic cross-sectional view illustrating schematically an image forming apparatus according to the invention.

Hereinafter, with reference to the drawings, embodiments of the invention will be exemplarily described in detail. However, dimensions, materials, shapes, and relative positions of components described in the embodiments are appropriately changed depending on structures and various conditions of apparatuses to which the invention is applied and therefore the scope of the invention is not intended to be limited thereto unless otherwise particularly specified. In each of the drawings, components denoted by the same reference numerals have the same structure or operation, and the duplication description thereof will not be appropriately presented.

[First Embodiment]

FIG. 1 is a schematic cross-sectional view illustrating schematically an image forming apparatus 50 according to the invention. In the following description, each of the stations denoted by reference numerals with Y, M, C, and K means member for yellow, magenta, cyan, and black, and these members will be described below by reference numerals without signs of Y, M, C, and K. The image forming apparatus 50 illustrated in FIG. 1 is an example of a full-color image forming apparatus (complex machine having all of copying machine, printer function, and FAX function). In FIG. 1, the image forming apparatus 50 has a plurality of image forming stations (four image forming stations in this embodiment) which are transversely juxtaposed with each other in an image forming apparatus body (hereinafter, referred to as an "apparatus body 50A").

Each of the stations includes a drum-like electrophotographic photosensitive drum (referred to as a "photosensitive drum 10" in this embodiment) as an "image bearing member". In this embodiment, the photosensitive drums 10 sequentially bear color images of a yellow (Y) component, a magenta (M) component, a cyan (C) component, and a black (K) component, respectively. These photosensitive drums 10 are rotatably driven at a predetermined process speed in an arrow direction "A" (counterclockwise direction) by a drum motor which is not illustrated in the drawing.

For example, a charging device 11, a scanner unit 12, a developing device 13, an intermediate belt unit 14, and a cleaning device 15 are sequentially disposed around each of the photosensitive drums 10 according to a rotational direction of the photosensitive drum 10. The charging device 11 (charging portion) is configured to uniformly charge the surface of the photosensitive drum 10. The scanner unit 12 (exposure portion) is configured to irradiate the photosensitive drum 10 with a laser beam based on image information and form an electrostatic image on the photosensitive drum 10.

The developing device 13 as a "developing portion" is configured to develop the electrostatic image formed on the surface of the photosensitive drum 10 with a toner and generate a developer image (toner image). The intermediate belt unit 14 (electrostatic transfer portion) is configured to transfer the toner image on the photosensitive drum 10 onto a sheet. The cleaning device 15 (cleaning portion) is configured to remove a transfer residual toner remaining on the surface of the photosensitive drum 10 after the transfer.

Hereinafter, the image forming station for yellow (Y) out of four colors will be described as an example. A photosensitive drum 10Y is uniformly subjected to a charging treatment by a charging device 11Y during a rotation process so as to have predetermined polarity and potential. Then, the photosensitive drum 10Y is exposed to light by a laser scanner 12Y, whereby an electrostatic image of image information is formed on the photosensitive drum 10Y.

Next, the electrostatic image formed on the photosensitive drum 10Y is visualized by a developing device [15Y] *13Y* and thus a toner image is formed on the photosensitive drum 10Y. Subsequently, the toner image formed on the photosensitive drum 10 is transferred onto the intermediate belt unit 14 by a primary transfer roller 16Y. Thereafter, the toner image on the intermediate belt unit 14 is transferred onto a sheet or other output objects by a secondary transfer roller 17. Similar processes are performed on the image forming stations for other three colors (magenta (M), cyan (C), and black (K)).

[Driving device]

A driving device of an image preparing portion which drives the photosensitive [drum] *drums* 10, the intermediate belt unit 14, and the developing [device] *devices* 13 equipped with a driving transmission device (*driving force transfer unit*), which is a feature of the invention, will be described below.

Figure 2A:
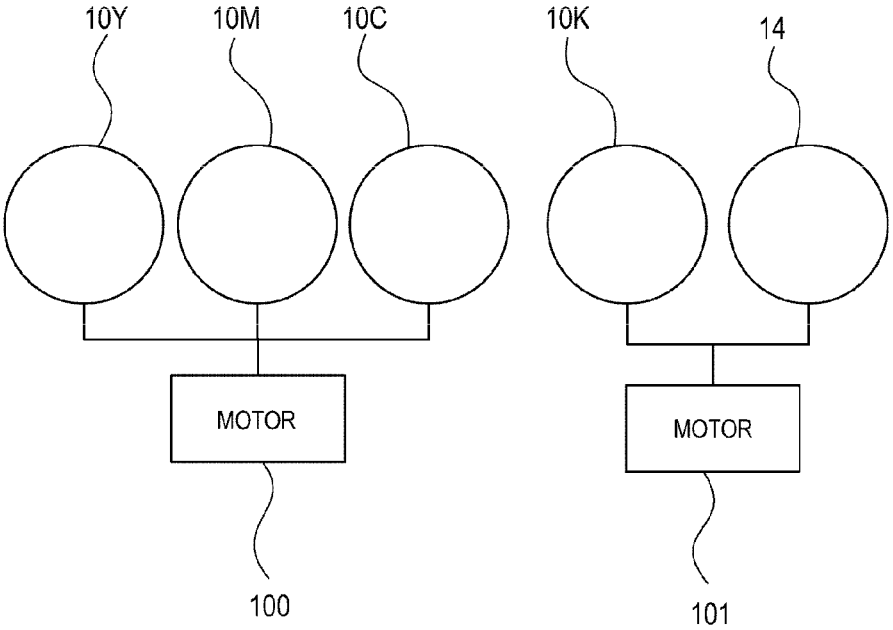
FIG. 2A is a schematic diagram illustrating a state where motors are connected to a photosensitive drum and an intermediate belt unit, respectively.

FIG. 2A is a schematic diagram illustrating a state where motors 100 and 101 are connected to the photosensitive [drum] *drums* 10 and the intermediate belt unit 14, respectively. As illustrated in FIG. 2A, the photosensitive drums 10Y, 10M, and 10C are driven by the motor 100, and the photosensitive drum 10K and the intermediate belt unit 14 are driven by the motor 101.

Figure 2B:
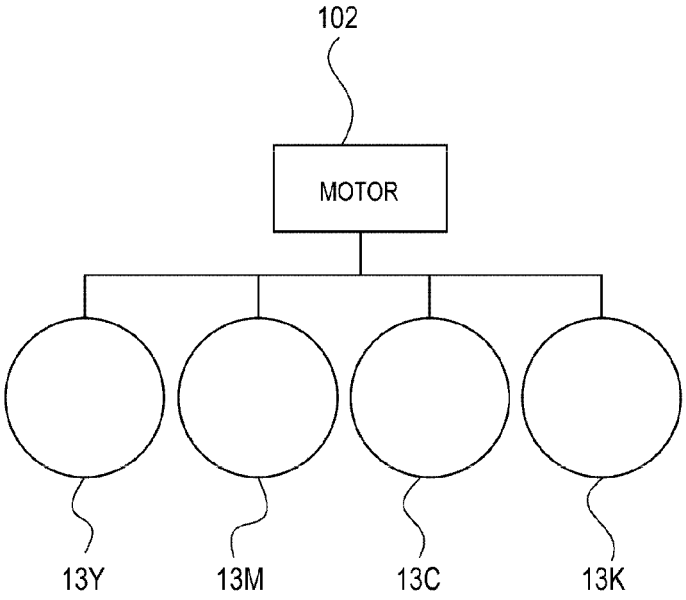
FIG. 2B is a schematic diagram of a driving configuration of a developing device.

FIG. 2B is a schematic diagram illustrating a state where a motor 102 is connected to the developing [device] *devices* 13. As illustrated in FIG. 2B, the developing devices 13Y, 13M, 13C, and 13K are driven by the motor 102.

Figure 3:
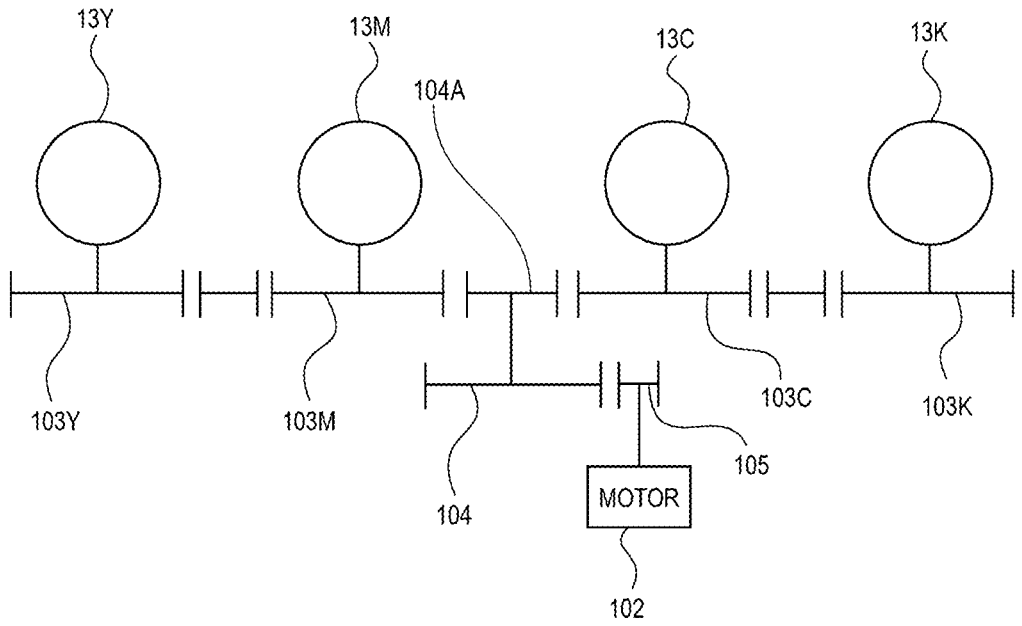
FIG. 3 is a schematic diagram of a gear arrangement in the driving configuration of the developing device illustrated in FIG. 2B.

FIG. 3 is a schematic diagram of a gear arrangement in a driving configuration of the developing [device] *devices* 13 illustrated in FIG. 2B. As illustrated in FIG. 3, the developing [device 13 is] *devices 13 are* driven by [a] developing drive [gear] *gears* 103 provided coaxially with a drive input position. A DC brushless motor is often used as the motor 102, which generally has a rotation speed from about 2000 to 3000 rpm in terms of efficiency.

The rotation speed of the developing [device] *devices* 13 to be often used is about 100 to 500 rpm, thereby being reduced by a gear ratio between a developing reduction gear 104, a developing motor gear 105, and the developing drive [gear] *gears* 103. *In the embodiment shown in FIG. 3, a smaller gear 104A rotates coaxially with the developing reduction gear 104 and is configured to engage with the developing drive gear 103M and the developing drive gear 103C. The diameter of the smaller gear 104A is smaller than the diameter of the developing reduction gear 104.* As in this configuration, in a case where a plurality of rotating objects is rotated by one motor, a large load is concentrated on the developing reduction gear 104 compared with a configuration in which one rotation object is rotated by one motor.

Figure 4A:
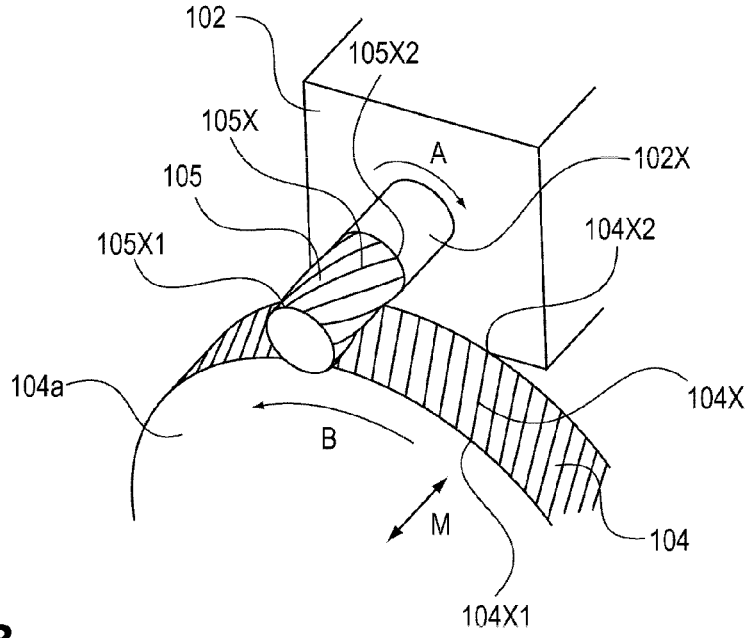
FIGS. 4A and 4B are perspective views illustrating a developing motor gear and a developing reduction gear in detail.
Figure 4B:
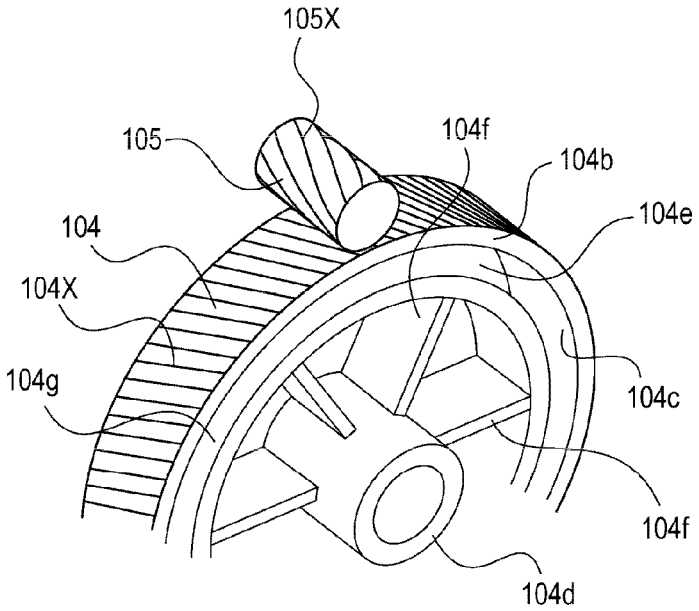

FIG. 4A is a perspective view illustrating the developing motor gear 105 and the developing reduction gear 104 in detail. FIG. 4B is a view as seen from the back in FIG. 4A. Referring to FIGS. 4A and 4B, the shapes of the developing motor gear 105 and the developing reduction gear 104 corresponding to the driving gear of this embodiment will be described below in detail.

The motor 102 is provided as a "driving portion" which drives the developing motor gear 105 of the developing [device] *devices* 13. The driving force of the motor 102 is transmitted to the developing [device] *devices* 13 through a driving transmission portion. The developing motor gear 105 as a "first helical gear" and the developing reduction gear 104 as a "second helical gear" are disposed to come in contact with each other, and the driving force is transmitted to the developing reduction gear 104 from the developing motor gear 105.

In the case of being viewed from the above in FIG. 4A, since the developing motor gear 105 has teeth which are cut in a direction from a lower left toward an upper right, it is formed by right-twisted helical teeth. In addition, since the developing reduction gear 104 has teeth which are cut in a direction from a lower right toward an upper left, it is formed by left-twisted helical teeth. In this way, the helical gears coming in contact with each other can be obtained by a combination of the right-twisted teeth and the left-twisted teeth in a reverse direction.

As illustrated in FIG. 4A, the developing motor gear 105 is formed in such a manner of being directly subjected to gear cutting together with a metallic driving shaft 102X of the motor 102 as a "motor" which generates a driving force. Therefore, the developing motor gear 105 is totally formed of a metal.

As illustrated in FIG. 4B, the developing reduction gear 104 is engaged with the developing motor gear 105. The developing reduction gear 104 includes a rim 104c, which is formed of a resin and has an outer circumference formed with teeth, a boss 104d, which is the center of rotation of the rim 104c (simultaneously, forming the center of rotation of the gear), and a web 104e through which the rim 104c and the boss 104d are connected to each other. *The developing reduction gear 104 may be formed of a resin.*

In addition, [a rib] *ribs* 104f and a rib 104g protrude from the face of the web 104e (*projecting from the web 104e in a tooth width direction M, discussed further below*). *As can be seen in FIG. 4, a projecting dimension of the boss 104d from the web 104e is larger than a projecting dimension of*

*each of the ribs 104f from the web 104e*. The [rib] *ribs* 104f radially [extends] *extend* in a radial fashion (in a radial ray fashion) (in a direction [separated] *away* from the boss 104d) from the boss 104d for the purpose of reinforcement of the developing reduction gear 104. The rib 104g is concentrically disposed with respect to the boss 104d. *In a direction of the diameter of the developing reduction gear 104, a distance between the boss 104d and the rib 104g is larger than a distance between the rib 104g and the rim 104c*. The [rib 104f is] *ribs 104f are* disposed with a predetermined distance from the rim 104c so as to prevent tooth-face accuracy from deteriorating due to shrinkage during molding and [is] *are* formed not to come in contact with the rim 104c.

Figure 5:
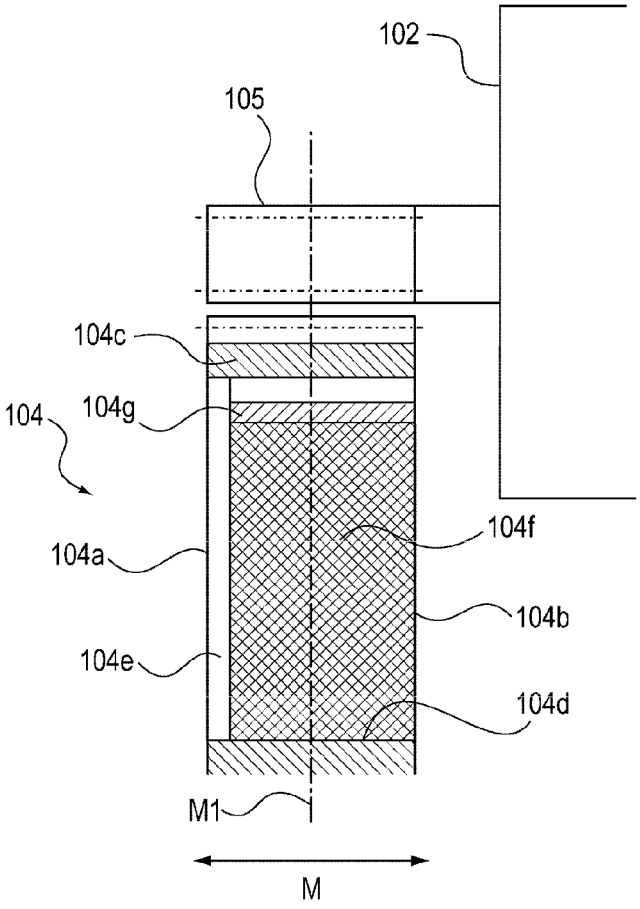
FIG. 5 is a cross-sectional view of the developing motor gear and the developing reduction gear.

FIG. 5 is a cross-sectional view of the developing motor gear 105 and the developing reduction gear 104. The web 104e is provided on a front side 104a of the developing reduction gear 104. For this reason, [a tooth width direction M of] the web 104e is positioned at a left end deviated from a center M1 in [the] *a* tooth width direction M. Herein, the tooth width direction M refers to a thickness direction of the gear.

Therefore, a gradient of torsional rigidity in the tooth width direction M is formed to be large at the front side 104a of the developing reduction gear 104 and to be small at a rear side 104b thereof. That is, the torsional rigidity of developing reduction gear 104 in the tooth width direction M becomes gradually smaller from the front side 104a (one side) toward the rear side 104b (the other side) in the tooth width direction M. For this reason, the developing reduction gear 104 refers to a helical gear in which the torsional rigidity in the tooth width direction M of the front side 104a (one side end) in the tooth width direction M of the developing reduction gear 104 is larger than the torsional rigidity in the tooth width direction of the rear side 104b (the other side end).

In other words, the torsional rigidity in the tooth width direction M becomes gradually smaller from a side [where] *closer to* the web 104e [is closer to] *in* the tooth width direction M toward a side [where] *farther from* the web 104e [is not closer to] *in* the tooth width direction M. For this reason, it is said that torsional rigidity at the side [where] *farther from* the web 104e [is not closer to] *in* the tooth width direction M is smaller than the torsional rigidity at the side [where] *closer to* the web 104e [is closer to] *in* the tooth width direction M. At least one of the developing motor gear 105 and the developing reduction gear 104 may be configured in this manner.

Returning back to FIGS. 4A and 4B, the description will be made below. The developing motor gear 105 rotates in a direction indicated by an arrow A, and the developing reduction gear 104 engaged with the developing motor gear 105 rotates in a direction indicated by an arrow B. [The] *A* helical gear has a property that comes in contact with the other gear to be engaged from an advancing side in the rotational direction.

That is, [the] *a* helical gear sequentially comes in contact with the other gear to be engaged from an advancing helical tooth in the advancing direction of each rotating helical teeth. That is, since the developing motor gear 105 is right-twisted and thus rotates in the direction indicated by the arrow A, a rear end 105X2 of helical teeth 105X [rotates] *engages with a helical tooth 104X of the developing reduction gear 104* earlier than a front end 105X1 thereof [in the direction indicated by the arrow A]. In addition, since the developing reduction gear 104 is left-twisted and thus rotates in the direction indicated by the arrow B, a rear end 104X2 of helical teeth 104X [rotates] *engages with a helical tooth 105X of the developing motor gear 105* earlier than a front end 104X1 thereof [in the direction indicated by the arrow B]. Accordingly, the developing motor gear 105 and the developing reduction gear 104 come in contact with the other gear to be engaged from the rear ends 105X2 and 104X2 advancing in the advancing direction, respectively.

In the configuration of this embodiment, the direction of the helical teeth is set such that the contact occurs from the rear side 104b having the small torsional rigidity. That is, a twist direction of the helical teeth and the rotational direction of the developing motor gear 105 due to the motor 102 are set such that the developing motor gear 105 and the developing reduction gear 104 are engaged with each other in such a manner that the teeth come in contact with each other at the side (the other side in the tooth width direction) (the other side end) having the small torsional rigidity earlier than the side (one side in the tooth width direction) (one side end) having the large torsional rigidity.

A simulation experiment is performed to observe the contact state of the teeth of this embodiment configured as described above and to calculate the maximum value of tooth root stress. The simulation experiment is performed using Abaqus which is versatile software for non-linear structure analysis. The developing motor gear 105 is a rigid body and the developing reduction gear 104 is an elastic body having a Young's modulus of 2200 MPa. A module of the gear is 0.4, a twist angle is 20°, a pressure angle is 20°, the number of teeth of the developing motor gear 105 is 11, the number of teeth of the developing reduction gear 104 is 86, and a driving load is 0.8 N·m. In this way, the number of teeth of the developing motor gear 105 is set to be smaller than the number of teeth of the developing reduction gear 104.

FIGS. 6A to 6F are perspective views illustrating calculation results of the contact state of the teeth when the developing reduction gear 104 rotates in the direction indicated by an arrow B and an arrow C. In order to make it easy to see the contact state, only the tooth surface of the developing motor gear 105 is illustrated. In addition, the developing reduction gear 104 illustrated in FIGS. 6A to 6F looks like a spur gear in external appearance, but has the left-twisted helical teeth which are left-twisted with respect to the axial line as described above in fact. FIGS. 6A to 6F are enlarged diagrams of the actual helical teeth, respectively.

In FIGS. 6A to 6F, a contact portion is indicated by a black-painted portion K. The developing reduction gear 104 rotates in the direction indicated by the arrow B in this order of FIGS. 6A to 6C. As the helical teeth 105X of the developing motor gear 105 rotate, the developing motor gear 105 continues to come in sequential contact with the developing reduction gear 104 from the rear end 105X2 side which is the advancing side of the helical teeth. Then, the contact area between the developing motor gear 105 and the developing reduction gear 104 shifts from the rear end 104X2 of the developing reduction gear 104 to the front end 104X1. In addition, it is understood that three helical teeth 105X of the developing motor gear 105 always come in contact with the developing reduction gear 104 during the rotation.

Figure 6A:
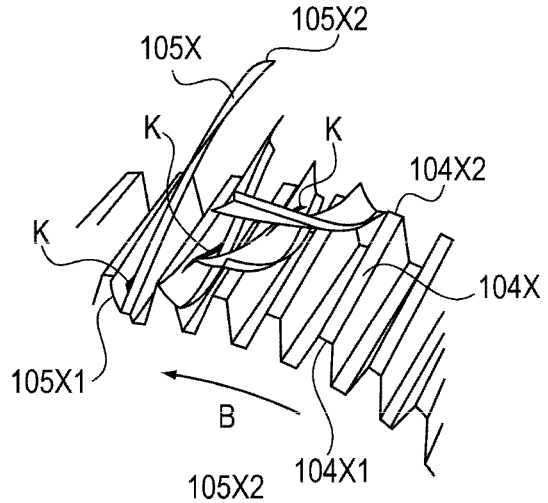
FIGS. 6A to 6F are perspective views illustrating calculation results of a contact state of teeth, respectively.
Figure 6B:
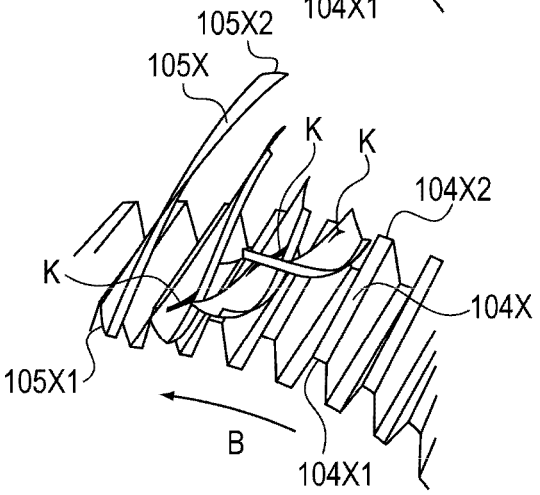
Figure 6C:
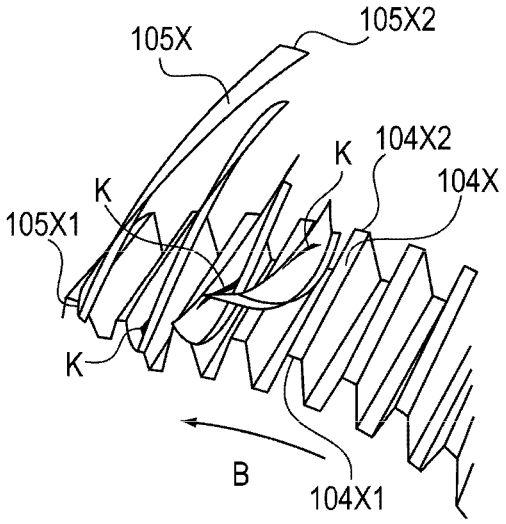
Figure 6D:
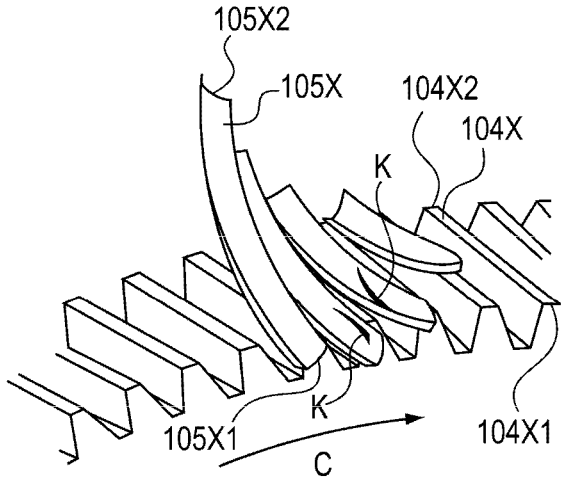
Figure 6E:
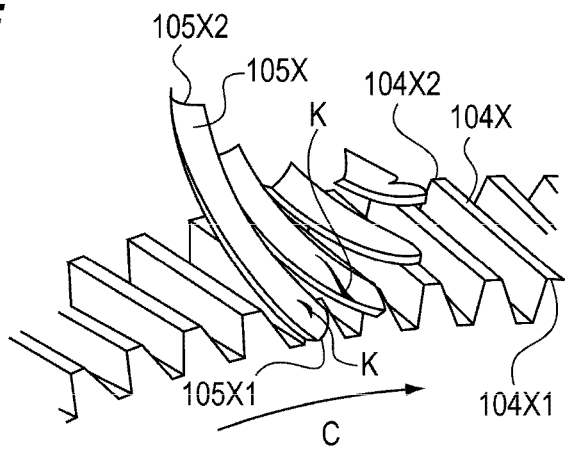
Figure 6F:
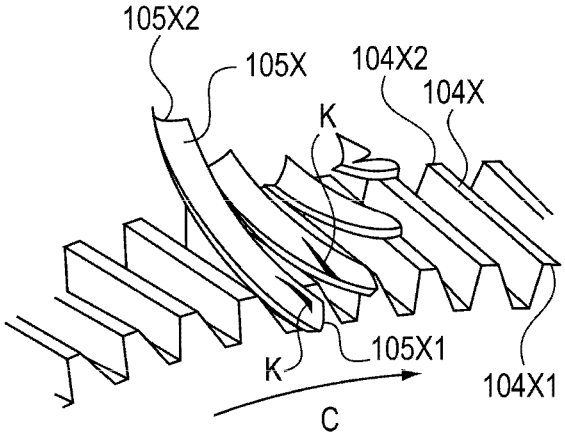

FIGS. 6D to 6F are illustrated in comparison with this embodiment and are perspective views illustrating calculation results of a contact state of teeth when the developing reduction gear 104 rotates in the direction indicated by an arrow C which is a direction reverse to the direction illustrated in FIGS. 6A to 6C, respectively. Since the helical teeth 105X of the developing motor gear 105 rotate in a reverse direction, the advancing direction of the helical teeth is also reverse and thus the developing motor gear 105 continues to come in sequential contact with the developing reduction gear 104 from the front end 105X1 side. Then, the number of the helical teeth 105X of the developing motor gear 105, which always come in contact with the developing reduction gear 104 during the rotation, is reduced to two.

Comparing these two examples with each other, in the rotational direction of this embodiment, since the developing motor gear 105 comes in contact with the developing reduction gear 104 from the rear side 104b having the small torsional rigidity, and the developing motor gear 105 comes in contact with a deformable portion of the developing reduction gear 104, the number of the teeth of the developing motor gear 105 coming in contact with the developing reduction gear 104 at all times increases. Meanwhile, in the rotation in the reverse direction, since the developing motor gear 105 comes in contact with the developing reduction gear 104 from the front side 104a having the large torsional rigidity, and the developing motor gear 105 comes in contact with a hardly deformable portion of the developing reduction gear 104, the number of the teeth of the developing motor gear 105 coming in contact with the developing reduction gear 104 at all times reduces.

Figure 7A:
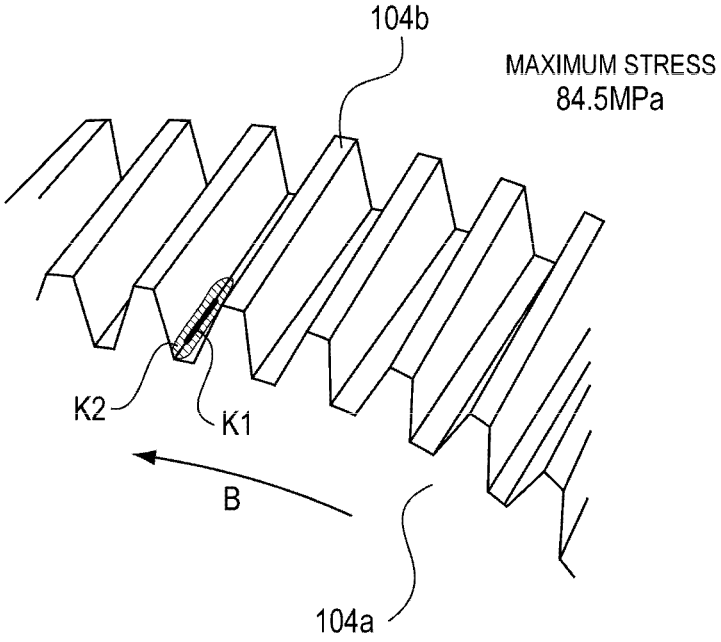
FIGS. 7A and 7B are numerical value-attached perspective views illustrating maximum stress in a developing reduction gear and calculation results of occurrence points of the maximum stress.
Figure 7B:
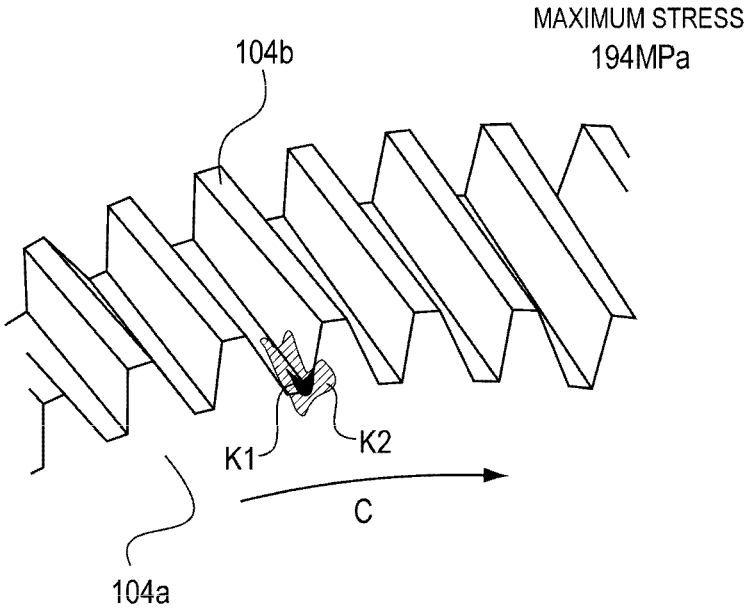

FIGS. 7A and 7B are numerical value-attached perspective views illustrating maximum stress and calculation results of occurrence points of the maximum stress in the developing reduction gear 104, respectively. It indicates that stress becomes gradually higher in the order from a gray-painted portion K2 to a black-painted portion K1. FIG. 7A illustrates the calculation results when the developing reduction gear 104 rotates in the rotational direction (direction indicated by the arrow B) of this embodiment corresponding to FIGS. 6A to 6C. FIG. 7B illustrates the calculation results when the developing reduction gear 104 rotates in the rotational direction (direction indicated by the arrow C) corresponding to FIGS. 6D to 6F, which is reverse to the rotational direction of this embodiment.

A stress value is expressed by the maximum principal stress. Even in any case, the maximum stress occurs in a tooth root in the vicinity of the front side 104a having the large torsional rigidity. [When the maximum stress value in this embodiment (see FIG. 7A) is 1, the] *The* maximum stress value during the rotation in the reverse direction (see FIG. 7B) [becomes] *is* 2.3 *times larger than the maximum stress value of this embodiment* (*see FIG. 7A*) *during the rotation in the direction indicated by the arrow B*.

In this embodiment (see FIG. 7A), since the contact number of the teeth, that is, the contact area to which the load is applied becomes larger when the developing reduction gear 104 rotates in the direction indicated by the arrow B, the stress value becomes smaller so as to relatively reduce the amount of deformation of each tooth and the maximum stress also becomes smaller, which is 84.5 MPa. Whereas, in the comparative example (see FIG. 7B), since the contact number of the teeth, that is, the contact area to which the load is applied becomes smaller when the developing reduction gear 104 rotates in the direction indicated by the arrow C, the stress value becomes larger so as to relatively increase the amount of deformation of each tooth and the maximum stress also becomes larger, which is 194 MPa.

According to this embodiment, when high loads are transmitted with a small module, since the rigidity increases to ensure strength and thus deterioration in accuracy of the tooth surface is not caused by the shrinkage during molding, it is possible to provide a driving configuration in which a high-quality image not having a banding image can be output.

[Second Embodiment]

Figure 8:
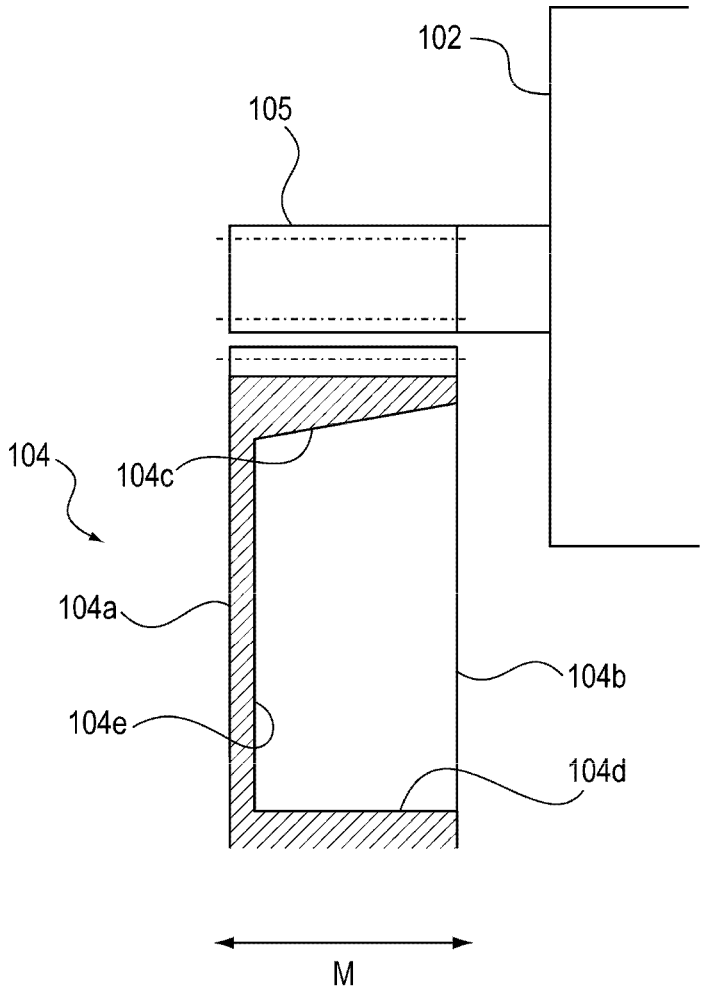
FIG. 8 is a cross-sectional view of a developing motor gear and a developing reduction gear according to a second embodiment.

FIG. 8 is a cross-sectional view of a developing motor gear 105 and a developing reduction gear 104 according to a second embodiment. A configuration of the second embodiment is [the same as] *similar to* that of the first embodiment [except that a gradient of torsional rigidity in a tooth width direction M of the developing reduction gear 104 is provided], and the description of *features of the second embodiment that have* the same configuration *as the first embodiment* will not be presented.

The thickness of a rim 104c of the developing reduction gear 104 becomes gradually thinner from a front side 104a (one side) toward a rear side 104b (the other side) in the tooth width direction M. For this reason, the gradient of the torsional rigidity in the tooth width direction M is formed to be large at the front side 104a and to be small at the rear side 104b. Thus, the torsional rigidity in the tooth width direction M of the developing reduction gear 104 becomes gradually smaller from the front side 104a (one side) toward the rear side 104b (the other side) in the tooth width direction M. In other words, the torsional rigidity in the tooth width direction M becomes gradually smaller from a thick side of the rim 104c toward a thin side of the rim 104c. For this reason, it is also considered that the torsional rigidity at the thin side of the rim 104c is smaller than the torsional rigidity at the thick side of the rim 104c.

[Third Embodiment]

Figure 9:
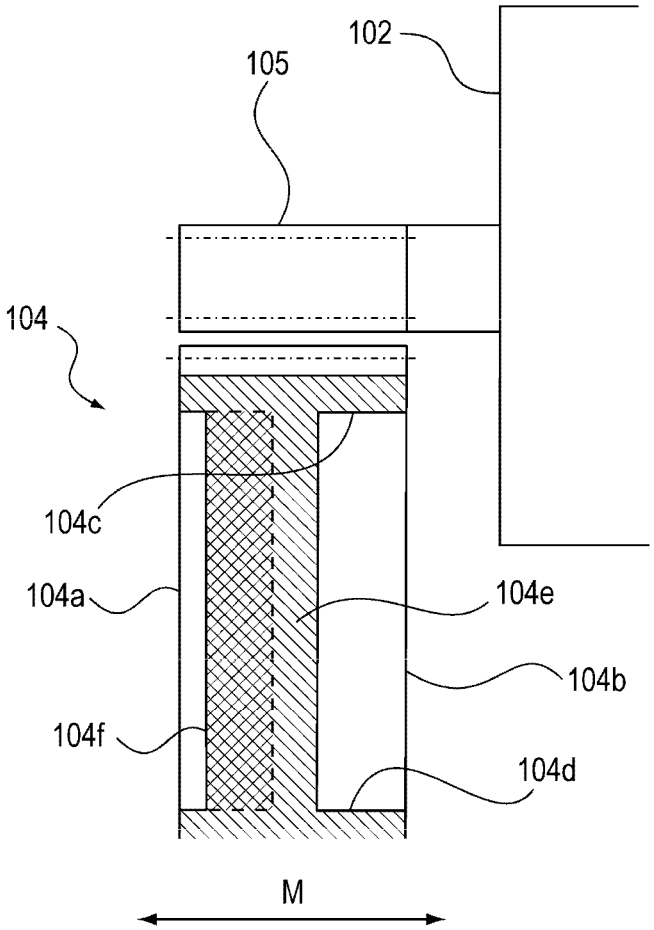
FIG. 9 is a cross-sectional view of a developing motor gear and a developing reduction gear according to a third embodiment.

FIG. 9 is a cross-sectional view illustrating a developing motor gear 105 and a developing reduction gear 104 according to a third embodiment in detail. A configuration of this embodiment is [the same as] *similar to* that of the first embodiment [except that a gradient of torsional rigidity in a tooth width direction M of the developing reduction gear 104 is provided], and the description of *features of the third embodiment that have* the same configuration *as the first embodiment* will not be presented.

In this embodiment, the developing reduction gear 104 is formed with a web 104e between a boss 104d and a rim 104c. The web 104e is disposed substantially at the center in the tooth width direction M of the developing reduction gear 104. The web 104e is formed in a disk-like plate shape around the boss [106] *104d*.

On the premise of this configuration, a rib 104f radially extends from the boss 104d (this is the same as the configuration in FIG. 4B) and protrudes toward a front side 104a from the web 104e (this is different from the configuration in FIG. 4B) at the same time. In this way, the rib 104f is disposed at only the front side 104a (one side) in the tooth width direction M. For this reason, a gradient of torsional rigidity in the tooth width direction M is formed to be large at the front side 104a and to be small at a rear side 104b.

Thus, the torsional rigidity in the tooth width direction M of the developing reduction gear 104 becomes gradually smaller from the front side 104a (one side) toward the rear side 104b (the other side) in the tooth width direction M. In other words, the torsional rigidity in the tooth width direction M becomes gradually smaller from a side disposed with the rib 104f toward a side not disposed with the rib 104f. For this reason, it is also considered that the torsional rigidity in the tooth width direction M at the side not disposed with the rib 104f is smaller than the torsional rigidity in the tooth width direction M at the side disposed with the rib 104f.

According to any one configuration of the first to third embodiments, it is possible to suppress stress concentration on a gear tooth root even when the module is reduced compared to the related art.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-221347, filed Oct. 30, 2014, which is hereby incorporated by reference herein in its entirety.

What is claimed is:

1. An image forming apparatus that forms an image on a recording material, the image forming apparatus comprising:

*a first photosensitive drum;*

*a second photosensitive drum;*

*a first driving motor configured to generate a driving force to be transferred to the first photosensitive drum and the second photosensitive drum;*

*a first gear;*

*a first developing portion connected to the first gear, the first developing portion being configured to develop an electrostatic image on the first photosensitive drum with a toner and rotate in a case where a driving force is transferred to the first gear;*

*a second gear;*

*a second developing portion connected to the second gear, the second developing portion being configured to develop an electrostatic image on the second photosensitive drum with a toner of color different from the toner of the first developing portion and rotate in a case where a driving force is transferred to the second gear; and*

*a driving force transfer unit configured to transfer a driving force to the first gear and the second gear, the driving force transfer unit including:*

(*A*) a first helical gear *including a plurality of teeth*; [and]

(*B*) *a second driving motor configured to generate a driving force for rotating the first helical gear and connected to the first helical gear to transmit the driving force of the second driving motor to the first helical gear; and*

(*C*) a second helical gear [that is engaged] *and a third gear which transfer the driving force of the second driving motor to the first gear and the second gear, the second helical gear configured to engage* with the first helical gear, [the second helical gear having a first side and a second side with respect to an axis direction of the second helical gear] *the third gear rotating coaxially with the second helical gear and configured to engage with the first gear and the second gear, each of the third gear and the second helical gear having a diameter, the diameter of the third gear being smaller than the diameter of the second helical gear*, the second helical gear including:

(*a*) a rim [that has] *including* an outer circumference formed with a plurality of teeth[,] *configured to engage with the plurality of teeth of the first helical gear, the second helical gear including a first side relative to a center of the rim in a tooth width direction of the second helical gear and a second side relative to the center of the rim in the tooth width direction of the second helical gear;*

(*b*) a boss that is a center of rotation of the [rim, and] *second helical gear;*

(*c*) a web [through which] (*i*) *disposed at the first side and* (*ii*) *connecting* the rim and the boss[of the second helical gear are connected to each other.]*;*

(*d*) *a concentric rib* (*i*) *projecting from the web to the second side in the tooth width direction and* (*ii*) *being concentric with the boss; and*

(*e*) *a plurality of radial ribs* (*i*) *projecting from the web to the second side in the tooth width direction,* (*ii*) *extending from the boss in a radial fashion so as to connect the boss and the concentric rib, and* (*iii*) *disposed apart from the rim in a radial direction of the second helical gear,* wherein [the web is disposed so as to be shifted toward the first side, and] the plurality of teeth of the second helical gear is configured so that a region of each of the plurality of teeth at the second side of the second helical gear engages with the first helical gear earlier than when another region of *each of* the [tooth] *teeth* at the first side of the second helical gear engages with the first helical gear.

2. The image forming apparatus according to claim 1, wherein a torsional rigidity of the second side of the second helical gear is smaller than a torsional rigidity of the first side of the second helical gear.

[3. The image forming apparatus according to claim 1, wherein a thickness of the rim at the second side of the second helical gear is less than a thickness of the rim at the first side of the second helical gear.]

[4. The image forming apparatus according to claim 1, wherein the second helical gear includes a plurality of ribs that protrude in the axis direction from a face of the web and extend radially from the boss, such that each rib is exposed to only the second side of the second helical gear and is not exposed to the first side of the second helical gear, and a torsional rigidity of the second side of the second helical gear is smaller than a torsional rigidity of the first side of the second helical gear.]

5. The image forming apparatus according to claim 1, wherein the second helical gear is formed of a resin and the first helical gear is formed of a metal.

6. The image forming apparatus according to claim 5, wherein the number of teeth of the first helical gear is set to be smaller than the number of teeth of the second helical gear.

7. The image forming apparatus according to claim 6, [further comprising: a] *wherein the second driving* motor [that applies a driving force to the first helical gear] *includes a driving shaft, and* wherein the first helical gear is [subjected to gear cutting together with a] *formed by teeth cut directly on the* driving shaft of the motor.

[8. The image forming apparatus according to claim 7, further comprising:

an image bearing member; and a developing portion that develops an electrostatic image on a surface of the image bearing member with a toner, wherein the motor that applies the driving force to the first helical gear drives the developing portion.]

[9. The image forming apparatus according to claim 1, wherein the web has first and second outer surfaces with respect to the axis direction of the second helical gear, the first and second outer surfaces of the web being positioned at the first side of the second helical gear deviated from a center of the second helical gear in the axis direction.]

[10. An image forming apparatus that forms an image on a recording material, the image forming apparatus comprising:

a first helical gear; and a second helical gear that is engaged with said first helical gear, the second helical gear having a first side and a second side with respect to an axis direction of the second helical gear, the second helical gear including a plurality of teeth formed at an outer peripheral surface thereof and a wall portion formed at an inner peripheral surface thereof toward a rotation center of the second helical gear, the wall portion being formed continuously along the inner peripheral surface of the second helical gear, wherein the wall portion is disposed so as to be shifted toward the first side from a center with respect to the axis direction of the second helical gear, and the plurality of teeth of the second helical gear is configured so that a region of each of the plurality of teeth at the second side of the second helical gear engages with the first helical gear earlier than when another region of the tooth at the first side of the second helical gear engages with the first helical gear.]

[11. The image forming apparatus according to claim 10, wherein the wall portion has first and second outer surfaces with respect to the axis direction of the second helical gear, the first and second outer surfaces of the wall portion being positioned at the first side of the second helical gear deviated from a center of the second helical gear in the axis direction.]

[12. The image forming apparatus according to claim 11, wherein the wall portion is disposed at an end portion of the second helical gear in the axis direction of the second helical gear.]

*13. The image forming apparatus according to claim 1, wherein, in a direction of the diameter of the second helical gear, no rib is disposed between the concentric rib and the rim.*

*14. The image forming apparatus according to claim 1, wherein in a direction of the diameter of the second helical gear, a distance between the boss and the concentric rib is larger than a distance between the concentric rib and the rim.*

*15. The image forming apparatus according to claim 1, wherein, in the tooth width direction of the second helical gear, a projecting dimension of the boss from the web is larger than a projecting dimension of the plurality of radial ribs from the web.*

*16. An image forming apparatus that forms an image on a recording material, the image forming apparatus comprising:*

*a first photosensitive drum;*

*a second photosensitive drum;*

*a first driving motor configured to generate a driving force to be transferred to the first photosensitive drum and the second photosensitive drum;*

*a first gear;*

*a first developing portion connected to the first gear, the first developing portion being configured to develop an electrostatic image on the first photosensitive drum with a toner and rotate in a case where a driving force is transferred to the first gear;*

*a second gear;*

*a second developing portion connected to the second gear, the second developing portion being configured to develop an electrostatic image on the second photosensitive drum with a toner of color different from the toner of the first developing portion and rotate in a case where a driving force is transferred to the second gear; and*

*a driving force transfer unit configured to transfer a driving force to the first gear and the second gear, the driving force transfer unit including:*

*(A) a first helical gear including a plurality of teeth formed thereon;*

*(B) a second driving motor configured to generate a driving force for rotating the first helical gear and connected to the first helical gear to transmit the driving force of the second driving motor to the first helical gear; and*

*(C) a second helical gear and a third gear which transfer the driving force of the second driving motor to the first gear and the second gear, the second helical gear configured to engage with the first helical gear, the third gear rotating coaxially with the second helical gear and configured to engage with the first gear and the second gear, each of the third gear and the second helical gear having a diameter, the diameter of the third gear being smaller than the diameter of the second helical gear, the second helical gear including:*

*(a) a rim including an outer circumference formed with a plurality of teeth configured to engage with the plurality of teeth of the first helical gear;*

*(b) a boss that is a center of rotation of the second helical gear;*

*(c) a web (i) disposed at one side relative to a center of the rim in a tooth width direction of the second helical gear and (ii) connecting the rim and the boss;*

*(d) a concentric rib (i) projecting from the web to another side in the tooth width direction and (ii) being concentric with the boss; and*

*(e) a plurality of radial ribs (i) projecting from the web to the another side in the tooth width direction, (ii) extending from the boss in a radial fashion so as to connect the boss and the concentric rib, and (iii) disposed apart from the rim,*

*wherein the first helical gear and the second helical gear rotate to transfer the driving force of the second driving motor to the first gear and the second gear so that a contact portion between the teeth of the first helical gear and the teeth of the second helical gear shifts from the another side in the tooth width direction to the one side.*

*17. The image forming apparatus according to claim 16, wherein a twist direction of the teeth of the first helical gear, a twist direction of the teeth of the second helical gear, a rotary direction of the first helical gear, and a rotary direction of the second helical gear are configured so that an area of the another side in the tooth width direction of the second helical gear is contacted earlier than an area of the one side in the tooth width direction of the second helical gear.*

*18. The image forming apparatus according to claim 16, wherein a torsional rigidity of the second helical gear in the tooth width direction where the first helical gear and the second helical gear begin to be engaged is smaller than a torsional rigidity of the second helical gear in the tooth width direction where the web is disposed.*

*19. The image forming apparatus according to claim 16, wherein the second helical gear is formed of a resin and the first helical gear is formed of a metal.*

*20. The image forming apparatus according to claim 16, wherein a number of teeth of the first helical gear is smaller than a number of teeth of the second helical gear.*

*21. The image forming apparatus according to claim 16, wherein the second driving motor includes a driving shaft, and*

*wherein the first helical gear is formed by teeth cut directly on the driving shaft.*

*22. The image forming apparatus according to claim 16, wherein, in a direction of the diameter of the second helical gear, no rib is disposed between the concentric rib and the rim.*

*23. The image forming apparatus according to claim 16, wherein, in a direction of the diameter of the second helical gear, a distance between the boss and the concentric rib is larger than a distance between the concentric rib and the rim.*

*24. The image forming apparatus according to claim 16, wherein, in the tooth width direction of the second helical gear, a projecting dimension of the boss from the web is larger than a projecting dimension of the plurality of radial ribs from the web.*

* * * * *